July 21, 1959   J. BLOCH   2,895,522
MOLDED PLASTIC BASKET
Filed June 4, 1957
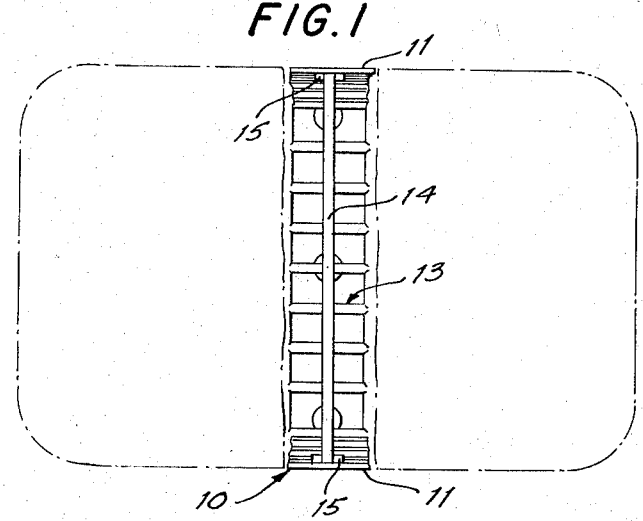
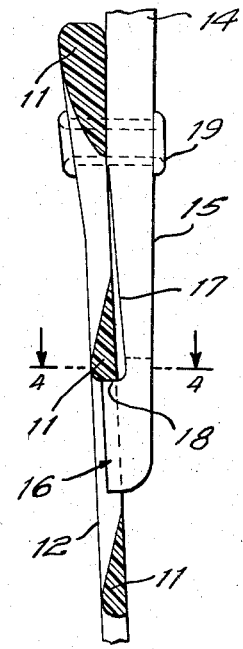
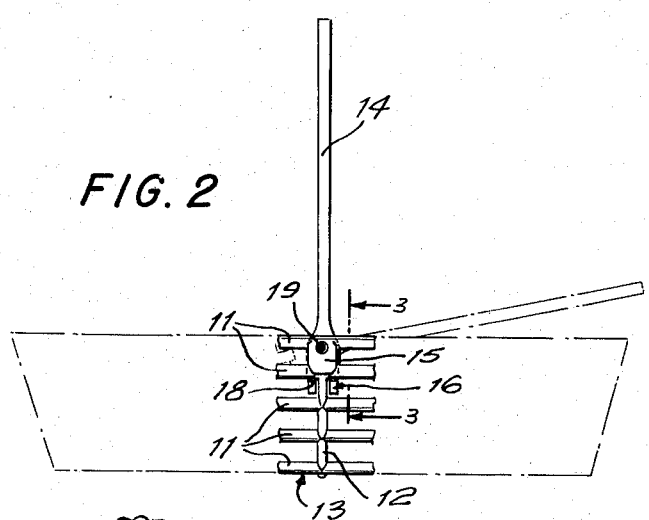
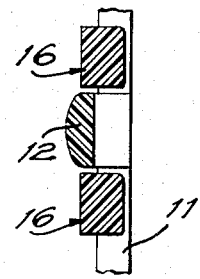
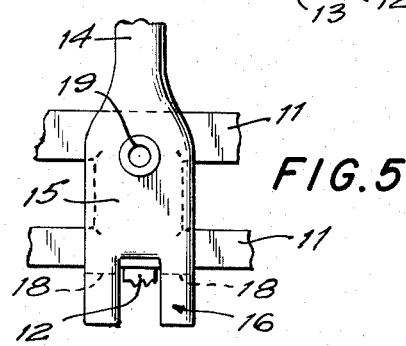
INVENTOR.
JACK BLOCH
BY
ATTORNEY

United States Patent Office 2,895,522
Patented July 21, 1959

2,895,522
MOLDED PLASTIC BASKET

Jack Bloch, Leominster, Mass., assignor, by mesne assignments, to Foster Grant Co., Inc., Leominster, Mass., a corporation of Delaware Application June 4, 1957, Serial No. 663,434

2 Claims. (Cl. 150—48)

This invention relates to a molded plastic basket having a self-locking pivoted or hinged handle.

An object of the invention is to provide an inexpensive lightweight basket made of molded plastic material, which basket is provided with a handle that is pivotally secured thereto and is self-locking when raised or swung into upright position to hold it releasably in that position.

A further object is to provide a basket having elements of flexible, resilient construction that permit of readily releasing the handle when it is desired to swing it into lowered position.

Without limitation to such specific use, the basket is primarily of the kind known as a "chicken basket," such as is used in the sale and distribution of Chicken-in-a-Basket.

Among the advantages of the present invention is that the basket is inexpensive to manufacture and permits of easily swinging and temporarily holding the handle in erect position or swinging it down out of the way for convenience in stacking, storing or shipping the baskets.

The preferred form of the invention is illustrated in the accompanying drawings, in which:

Fig. 1 is a fragmentary top plan view of the basket with its handle in erect position, only the middle portion of the basket being shown in full lines, the outline of the basket being indicated by dot-and-dash lines;

Fig. 2 is a similar view of the basket in side elevation, the handle being indicated in partly lowered position by dot-and-dash lines;

Fig. 3 is a fragmentary view in elevation of the basket and handle, on an enlarged scale, taken on the line 3—3 of Fig. 2;

Fig. 4 is a fragmentary transverse view partly in section taken on the line 4—4 of Fig. 3; and, Fig. 5 is a fragmentary view of the lower end of one arm of the hinged handle in its upright position, as viewed from the inside of the basket.

In the drawings, for the sake of clearness, only that part of the basket which cooperates in holding the handle in its raised position is shown in full lines.

Both the basket and its handle are molded into the desired shape, form, and size of any suitable thermoplastic material. One kind of such material, but without limitation, that has been found to be satisfactory for molding the product, is high impact styrene.

The interlocking or interengaging parts of the handle and basket should have sufficient resiliency to permit of snapping the handle into position to hold it temporarily raised but also to permit of its being readily unlocked or lowered so that it may be swung down. By molding the plastic parts sufficiently thin, the material will afford the requisite degree of inherent resiliency and flexibility to affect these results.

The basket 10 has bottom, side and end walls all molded, preferably in one piece, of any suitable thermoplastic material such for example as high pressure styrene. The side and end walls may slant upwardly from bottom to top, and comprise a plurality of horizontal strips 11 connected at spaced intervals by vertical ribs or strips 12. The elements 11 and 12 may, as shown, be formed with flat inner faces and curved outer faces. The structure is such as to simulate a wicker-work basket, although it may be of other design and of any desired dimensions. The bottom may be formed of spaced longitudinal and transverse strips 13.

The molded plastic elements 11 and 12 of the walls are formed sufficiently thin in cross-section as to render them supple and to give them the desired degree of resiliency and flexibility. Such elements having a maximum thickness of about .030" have been found to give satisfactory results. The elements 13 of the bottom may be molded somewhat thicker in cross-section to give them rigidity.

The handle 14 has widened ends 15, the lower portion 16 of which is forked, as best seen in Fig. 5. The outer face 17 of each of the two branches of the fork taper downward and inward, as shown in Fig. 3, to form a hook or shoulder 18 at the extremity of each branch. The handle is pivotally connected at 19 to the middle vertical rib 12, at each side of the basket, by a grommet or other means.

In the erect position of the handle 14, its shoulders 18 hook under and bear against the lower edge of the horizontal strip 11 below the pivot point to hold the handle in that position with the branches of its forked portion 16 straddling the vertical rib 12.

The form of the ends of the handle together with the resiliency of the horizontal and vertical elements of the basket are such that when the handle is swung upright, the parts will spring into locking engagement so as to hold the handle temporarily in that position until it is released by springing the parts out of engagement, thus permitting the handle to be swung down freely in either direction.

It is to be understood that various modifications in the construction herein described and shown may be made within the scope of the invention.

What I claim is:

1. A basket comprising side walls formed of vertical and horizontal strips of molded thermoplastic material of sufficient thinness to have inherent resilience and flexibility, and a handle having its ends pivotally connected to a vertical strip at the middle of each side of the basket, the lower portion of each end of the handle being forked, each branch of the fork having an outwardly extending shoulder that is adapted to be springingly engaged with and to hook on to one of the resilient horizontal strips at each side of the basket to hold the handle releasably in erect position when it is swung into that position.

2. A basket comprising side walls formed of vertical and horizontal strips of molded thermoplastic material of sufficient thinness to have inherent resilience and flexibility, and a handle having its ends pivotally connected to vertical strips at the middle of the sides of the basket, the lower portion of the ends of the handle being forked, the outer face of each branch of the fork being tapered downward and inward to form a shoulder at the extremity of each branch, the shoulders of the handle being adapted to engage springingly with and to hook on the lower edge of each of a pair of resilient horizontal strips at opposite sides of the basket to hold the handle releasably in erect position when it is swung into such position.

References Cited in the file of this patent

UNITED STATES PATENTS

| | | |
|---|---|---|
| 576,188 | Fitch | Feb. 2, 1897 |
| 2,556,590 | Long | June 12, 1951 |